United States Patent [19]

Tachikawa et al.

[11] 3,857,173

[45] Dec. 31, 1974

[54] METHOD OF PRODUCING A COMPOSITE SUPERCONDUCTOR

[75] Inventors: Kyoji Tachikawa; Yuji Yoshida, both of Tokyo, Japan

[73] Assignee: The Director of National Research Institute for Metals, Tomoyoshi, Kawada, Tokyo, Japan

[22] Filed: June 22, 1973

[21] Appl. No.: 372,693

Related U.S. Application Data

[63] Continuation of Ser. No. 112,748, Feb. 4, 1971, abandoned.

[30] Foreign Application Priority Data

Feb. 9, 1970 Japan .............................. 45-10730

[52] U.S. Cl. .............. 29/599, 148/127, 174/DIG. 6, 335/216

[51] Int. Cl. ............................................ H01v 11/14

[58] Field of Search ... 29/599; 174/126 CP, DIG. 6; 335/216; 148/127

[56] References Cited

UNITED STATES PATENTS

| | | | |
|---|---|---|---|
| 3,509,622 | 5/1970 | Bernert et al. | 29/599 |
| 3,625,662 | 12/1971 | Roberts et al. | 29/599 X |
| 3,674,553 | 7/1972 | Tachikawa et al. | 29/599 X |
| 3,728,165 | 4/1973 | Howlett | 29/599 X |

FOREIGN PATENTS OR APPLICATIONS

| | | | |
|---|---|---|---|
| 1,039,316 | 8/1966 | Great Britain | 29/599 |

*Primary Examiner*—C. W. Lanham
*Assistant Examiner*—D. C. Reiley, III
*Attorney, Agent, or Firm*—Fitzpatrick, Cella, Harper & Scinto

[57] ABSTRACT

Superconductor including $V_3Ga$ or $V_3Si$ is disclosed. Superconductor including $V_3Ga$ or $V_3Si$ is produced by firstly making a composite of a vanadium core metal and a copper, silver or copper-silver alloy containing gallium or silicon, fabricating the composite to a desirable shape, followed by heat treatment. The vanadium core may contain titanium, zirconium or hafnium.

7 Claims, 5 Drawing Figures

METHOD OF PRODUCING A COMPOSITE SUPERCONDUCTOR

This is a continuation of application Ser. No. 112,748, filed Feb. 4, 1971, now abandoned.

BACKGROUND OF THE INVENTION

1. Field of the Invention

The present invention relates to a superconductor and a method of producing the superconductor, and more particularly, to a superconductor including $V_3Ga$ or $V_3Si$, and a method of production thereof.

2. Description of the Prior Art

At the present time, superconductors are mostly used as magnet wires capable of generating a strong DC magnetic field without consuming any electric power. Among the superconductors are an alloy wire which can be easily subjected to a plastic deformation and a compound wire which is brittle and can not be subjected to a plastic deformation. As the representative former superconductor, an alloy of niobium and zirconium and an alloy of niobium and titanium are known and have been used after drawing down to wires of about 0.25 mm in diameter. As the representative latter superconductor, $Nb_3Sn$ and $V_3Ga$ which have $\beta$-W type crystal structure are known. In general, a compound wire material is better than an alloy wire material in superconducting properties, but a compound wire is lacking in workability. Therefore, the production of a compound superconductor wire requires special contrivances. The present invention relates to a method of producing compound superconductors i.e., $V_3Ga$ and $V_3Si$ superconductors. The $V_3Ga$ and $V_3Si$ compounds have a high critical magnetic field amounting to 220 kOe or so at 4.2°K, and therefore, they possess extremely excellent properties as a superconducting magnet wire for generating a strong magnetic field.

In respect of $V_3Ga$, there is known a production technique wherein a vanadium core in a wire or tape form is continuously dipped in a molten gallium and after making gallium-diffused layer on the surface of the vanadium core, the resulting wire or tape is heat-treated at appropriate temperatures to produce continuous $V_3Ga$ layer. Further, it is known that before the aforementioned heat-treatment a copper coating on the material facilitates production of $V_3Ga$ (U.S. Pat. No. 3,674,553). On the other hand, as to $V_3Si$, it is difficult due to the high melting point of silicon to produce $V_3Si$ by dipping process as is in the case of $V_3Ga$ so that a process has been utilized in which after filling a vanadium pipe with powders of vanadium and silicon, it is fabricated into a wire, which is sintered subsequently by means of a heat treatment to produce a $V_3Si$ core in the wire.

Also it is known that when superconductive wire materials are put in practical applications, the surface thereof has to be covered with normal metals having low electrical resistance such as copper and silver so as to stabilize the superconductivity.

For that purpose, according to the conventional method in a compound superconductor it was required to provide specially a stabilizing metallic layer by copper or silver plating after the heat treatment.

SUMMARY OF THE INVENTION

According to the present invention, a superconductor comprising $V_3Ga$ or $V_3Si$ is produced by making a composite comprising a member selected from the group consisting of copper, silver and a copper-silver alloy, each of them containing 0.1 to 30 atomic percent gallium or 0.1 to 10 atomic percent silicon and a core metal selected from the group consisting of pure vanadium and vanadium alloy containing 0.1 to 10 atomic percent titanium, zirconium or hafnium, fabricating the resulting composite to a desirable shape, and subjecting the thus fabricated composite to a heat treatment.

According to another aspect of the present invention, there is provided a superconductor comprising a vanadium core, a $V_3Ga$ layer overlaying the vanadium core and a Cu-Ga alloy layer containing less than 30 atomic percent gallium overlaying the $V_3Ga$ layer, and if desired, the vanadium core may be omitted and the $V_3Ga$ become the core.

According to a further aspect of the present invention, there is provided a superconductor comprising a vanadium core, a $V_3Si$ layer overlaying the vanadium core and a Cu-Si alloy layer containing less than 10 atomic percent silicon overlaying the $V_3Si$ layer, and if desired, the vanadium core may be omitted and the $V_3Si$ become the core.

DETAILED DESCRIPTION OF THE INVENTION

Figure 1:
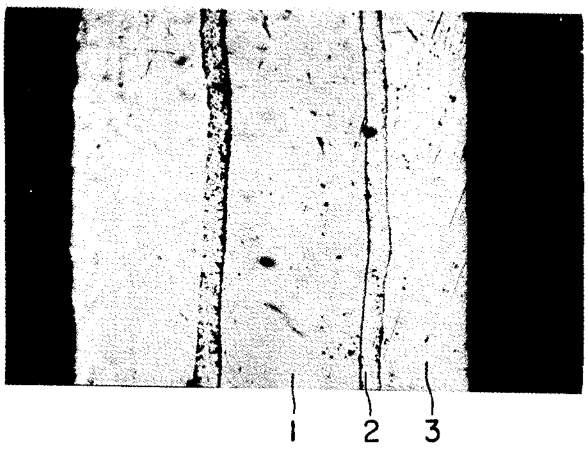
FIG. 1 is a photomicrographic representation of a section of a superconductive tape produced according to a method of the present invention.

According to the present invention, a superconductor of $V_3Ga$ or $V_3Si$ is produced by making a composite comprising copper, silver or a copper-silver alloy containing 0.1 to 30 atomic percent gallium or 0.1 to 10 atomic percent silicon and a core metal, i.e., vanadium or vanadium alloy containing 0.1 to 10 atomic percent titanium, zirconium or hafnium, and fabricating the resulting composite to a desirable configuration, for example, the composite is fabricated into wires, tapes or pipes by wire drawing, rolling or pipe drawing, respectively. The thus fabricated composite to a desirable shape is then heat-treated to make gallium or diffuse selectively from the alloy composed of one selected from the group of copper, silver and copper-silver and the other selected from the group of gallium and silicon into the core metal to produce a continuous layer of $V_3Ga$ or $V_3Si$ between the core metal and the copper, silver or copper-silver alloy containing a small amount of residual gallium or silicon. It is not necessary to leave unreacted vanadium core after the heat treatment. Thus according to the present invention, a normal metallic member for stabilizing superconductivity can be produced simultaneously with the formation of the superconductor.

Copper or silver is not diffused into $V_3Ga$ or $V_3Si$ compound so that the intrinsic superconducting properties of $V_3Ga$ or $V_3Si$ are not deteriorated. On the basis of such fact, the method of this invention has been accomplished.

As compared with the conventional methods as mentioned above, the method of the present invention has the following advantages. As a result of the diffusion occurring between the core metal and the alloy composed of one selected from the group of copper, silver and copper-silver and the other selected from the group of gallium and silicon, a $V_3Ga$ or $V_3Si$ layer and a metallic layer for stabilizing superconductivity consisting mainly of copper, silver or copper-silver alloy are formed and thereby additional steps of covering the superconductive member with a layer for stabilizing superconductivity can be omitted. Furthermore, the copper-gallium or silver-gallium or copper-silver-gallium alloys used for producing $V_3Ga$ wire materials and copper-silicon or silver-silicon or copper-silver-silicon alloys used for producing $V_3Si$ wire materials in the present invention can be readily melted in air and fabricating thereof at room temperature is exceedingly easy. Consequently, compared with the conventional production method, the method of the present invention simplifies the process, and is valuable in the practical applications. Moreover, a multi-filamentary $V_3Ga$ or $V_3Si$ superconductor suitable for AC application can be easily fabricated according to this invention.

Addition of titanium, zirconium or hafnium to the core metal, i.e., vanadium, facilitates the formation of a $V_3Ga$ or $V_3Si$ layer and at the same time makes crystalline grains of $V_3Ga$ or those of $V_3Si$ finer resulting in improvements in the superconductive current capacities.

According to the present invention, in the case of $V_3Ga$ a composite is made by using an alloy consisting of copper or silver or copper-silver alloy containing from 0.1 to 30, preferably 5 to 25, atomic percent of gallium and a core metal, that is, pure vanadium or a vanadium containing from 0.1 to 10, preferably 0.1 to 5, atomic percent of titanium, zirconium or hafnium to be subsequently fabricated into wires, tapes or pipes etc. by means of wire drawing, rolling or pipe drawing etc. Next, the product is heat-treated at temperatures of from 500° to 950°C for the period of from 5 minutes to 100 hours to make gallium selectively diffuse from said alloy into the core metal, i.e., vanadium or a vanadium alloy so as to form $V_3Ga$ layer on the core metal. Said heating temperature and period of time are determined depending upon the thickness and gallium contents in the alloy composed of copper, silver, copper-silver and gallium. Also, due to the heat-treatment, the metallic layer consisting mainly of copper or silver or copper-silver alloy which serves as a layer for stabilizing superconductivity is formed on the surface of $V_3Ga$ superconductor. According to the present production method, it is possible to omit a high vacuum diffusion equipment involving large amount of construction cost required for continuously diffusing gallium into a vanadium substrate in the conventional $V_3Ga$ conductor production method. Therefore, the manufacturing cost is considerably reduced.

In the case of $V_3Si$ wire, a composite is made by using copper or silver or copper-silver alloy containing from 0.1 to 10, preferably 5 to 10 atomic percent of silicon and a basic metal similar to that in the afore-mentioned case of $V_3Ga$ so as to fabricate it into the appropriate shape. Then the products are heat-treated at temperature of from 600° to 1,200°C for the period of from 5 minutes to 100 hours to make silicon diffuse selectively from the said alloy into the vanadium to produce a $V_3Si$ layer on the core metal. In the aforementioned case of $V_3Si$ said heating temperature and period of time are determined depending upon the thickness and gallium content in the alloy composed of copper, silver, copper-silver and silicon. Also by means of said heat treatment a metallic layer consisting mainly of copper or silver copper-silver alloy which serves as a layer for stabilzing superconductivity is formed on the surface of $V_3Si$ superconductor. The production in this manner solves the problems of lack in flexibility and uniformity of $V_3Si$ conductor produced by the conventional power sintering method and enables to obtain $V_3Si$ conductor with adequate flexibility and with $V_3Si$ layer uniformly developed on the substrate metal.

According to this invention, one or more of the composites are covered with a good conductive normal metal such as copper, silver or aluminum and fabricated into a desired configuration for the purpose of improving stabilization of superconductivity.

The good normal conductor coating may be produced by inserting the composite to a hole in the good normal conductor having a cross sectional shape corresponding to that of the composite, or by using a pipe-like composite and a pipe-like coating metal processed in such a manner that the outer diameter of the former is correspondent to the inner diameter of the latter and the former can be fitted into the latter. The cross sectional configuration of the superconductive matter can be prepared by an appropriate coating means in such a manner that the superconductive layer is located at a desirable position in the matter.

By the present invention, a conductor including lots of thin $V_3Ga$ or $V_3Si$ superconductive filaments embedded in Cu-Ga or Cu-Si alloy matrix can be easily fabricated. For example, a composite composed of Cu-Ga or Cu-Si alloy and a number of vanadium or vanadium alloy cores is fabricated into thin wire followed by heat treatment to produce a superconductor including many thin filamentary $V_3Ga$ or $V_3Si$. Up to the present, both alloy or compound superconductors have not been used for AC application such as transformers, AC motors or generators due to their AC hysteresis losses. It is theoretically calculated that an AC loss in superconductors is proportional of $d^3$ where $d$ is a diameter of a superconductor. Therefore, it can be expected that multi-filamentary $V_3Ga$ or $V_3Si$ superconductor produced by the present invention is not only suitable for DC application but also for AC application. In case of AC application, on the contrary to DC application, it is desirable that a matrix around superconductive filaments has relatively high electrical resistivity for decoupling each superconductive filament electrically. In the case of the present invention, the resistivity of Cu-Ga or Cu-Si alloy matrix can be increased by increasing the Ga or Si content. The Cu-Ga or Cu-Si alloy matrix should be also effective for mechanical reinforcement of the superconductor.

Example 1

An alloy bar 20 mm in diameter and 100 mm in length was made by blending 18 atomic percent of gallium with copper and melting them in a Tanmann furnace in air, and after casting the melts in a metallic mold, it was cut and shaped by a lathe to 18 mm in diameter, and at its center a hole 10 mm in diameter was drilled to form a copper-gallium alloy pipe. Into this pipe a pure vanadium bar 10 mm in diameter was inserted to form a composite and then the composite was rolled. Before making the composite, the copper-gallium pipe was annealed at 650°C and the pure vanadium bar at 800°C, respectively, for 1 hour. In the rolling work, at first, rolling was done with a grooved roll, then with a flat roll, and an intermediate annealing was made at 620°C to facilitate the fabrication obtaining finally a tape 0.13 mm in thickness, 10 mm in width and 20 m in length. In its sectional structure the vanadium core is 0.07 mm in thickness and the both faces thereof are covered with a copper gallium alloy layer 0.03 mm in thickness. As the hardness of vanadium and copper-gallium alloy is of a similar grade (Vickers hardness 100–150), therefore, they adhere mutually well enabling composite fabrication.

A sample of 3 mm wide and 50 mm long was cut off for measuring the superconducting properties the tape thus cut off was subjected to heat treatment in argon atmosphere at 700°C for 20 hours obtaining a superconductive tape having a transition temperature of 15.2°K. As the transition temperature, a temperature at which the electric resistance of the sample becomes one half of that at the normal state was taken. When the value of critical current was measured by applying an external magnetic field of 30 k0e to the same tape put in liquefied helium (4.2°K), a value as large as 170A was obtained. This tape can be easily soldered by lead-tin solder since the outer layer is a metallic layer consisting mainly of copper. An examination of the sectional structure on the heat treated tape using an optical microscope and an X-ray microanalyzer revealed a fact that a $V_3Ga$ layer of about 7$\mu$ in thickness developed on the vanadium base and, furthermore, a metallic layer consisting of copper and minor quantity of gallium developed thereon.

The presence of copper in the $V_3Ga$ layer was not detected by an X-ray microanalyzer. It is clear from the measurements of said transition temperature and critical current and analytical results by an X-ray microanalyzer that the gallium in the copper-gallium alloy was selectively diffused into the vanadium basic metal by the heat treatment at 700°C resulting in development of $V_3Ga$ layer and a metallic layer consisting mainly of copper developed on the surface thereof.

Figure 2:
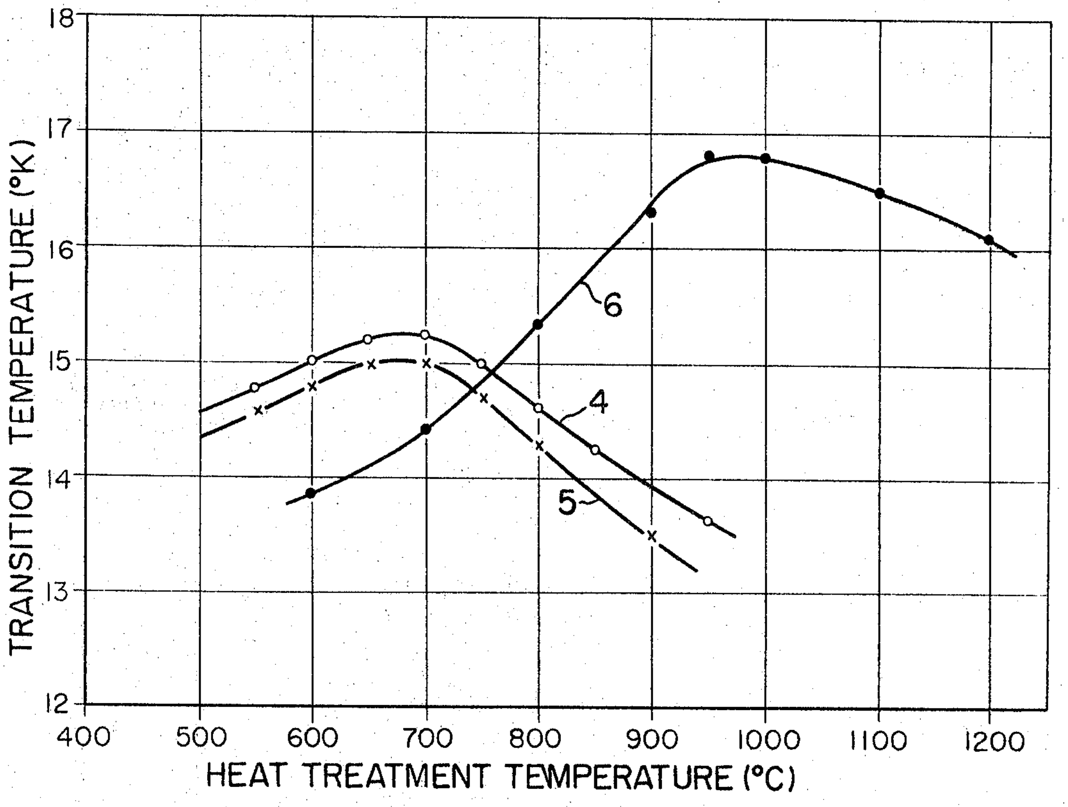
FIG. 2 is a graph showing the relation between heat treatment temperature and superconducting transition temperature of the superconductor produced according to a method of the present invention.
Figure 3:
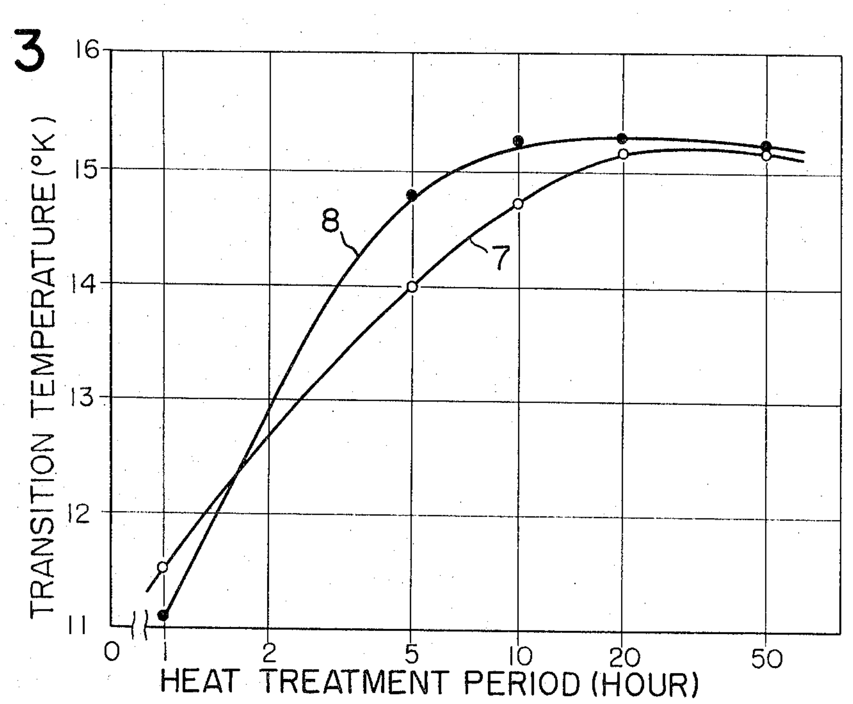
FIG. 3 is a graph showing the relation between heat treatment period and superconducting transition temperature of the superconductor produced according to a method of this invention.
Figure 4:
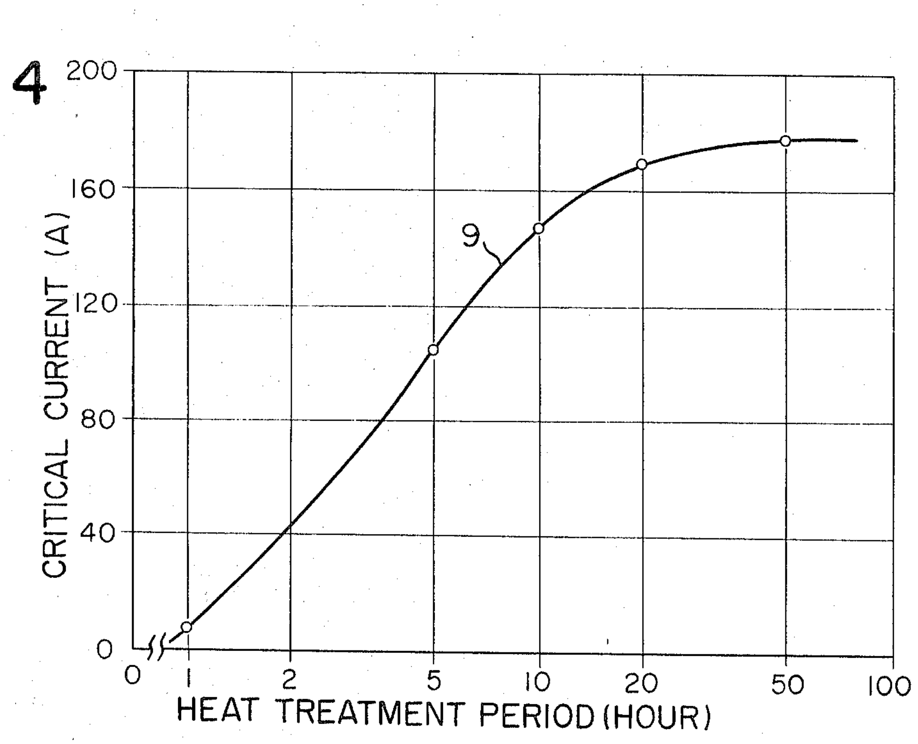
FIG. 4 is a graph showing the relation between heat treatment period and superconducting critical current of a superconductor produced according to the present invention.

FIG. 1 is a photomicrograph showing the sectional structure of the tape in this Example 1 after a heat treatment at 700°C for 20 hours, and 1 represents the substratum vanadium core, 2 the $V_3Ga$ compound layer, and 3 the metallic layer consisting of copper containing minor quantities of gallium. The following is a description on the changes in the superconductivity due to the heat treatment temperature and heat treatment period in this example. FIG. 2 shows the relationship between the heat treatment temperature (abscissa) and transition temperature (ordinate), and the curve 4 is a sample of this Example 1. As it is clear from the curve 4, high transition temperatures are obtainable in the temperature range of 600°C to 750°C. FIG. 3 shows the relation between heat-treatment period (abscissa: logarithmic scale) at 700°C and transition temperature (ordinates). The curve 7 in the diagram was obtained according to this Example 1. From this, it is clear that the heat treatment period required at 700°C is approximately 20 hours. With the rise of heat-treatment temperature the heating time required becomes shorter, but the maximum value of the transition temperature obtained gets lower. FIG. 4 shows the relation between heat treatment period (abscissa logarithmic scale) at 700°C and critical current (orindates) at 4.2°K, 30k0e, and the curve 9 in FIG. 4 was obtained according to this Example 1. From the curve, it is evident that this superconductor gives a critical current equal or superior to that of $V_3Ga$ wire materials produced by a prior art disclosed in Japanese Pat. application No. 41040/1966.

EXAMPLE 2

A tape 0.13 mm in thickness was made by following the procedure of Example 1, but using as a core metal an alloy consisting of vanadium containing 1 atomic percent of zirconium. Then, the resulting tape was subjected to a heat treatment at 700°C and the transition temperature was measured. The result is shown by the curve 8 in FIG. 3. As is obvious from the comparison of curve 8 with curve 7 in FIG. 3 corresponding to a case where pure vanadium is used as basic metal the addition of a small amount of zirconium to vanadium results in that only one half the heat treatment period is necessary for curve 8 to obtain a transition temperature as high as that for curve 7.

EXAMPLE 3

After blending 15 atomic percent of gallium with silver and melting them in a Tanmann furnace in air, the melts were cast in a metallic mold to make an alloy bar 20 mm in diameter, 100 mm in length, then it was cut and shaped to 18 mm in diameter with a lathe and at its center a hole 10 mm in diameter was drilled so as to form a silver-gallium alloy pipe. Into said pipe a pure vanadium bar 10 mm in diameter was inserted to make a composite. Before making composite the silver-gallium alloy pipe was annealed at 550°C and the pure vanadium bar at 800°C, respectively, for 1 hour. The composite was fabricated into a fine wire by wire drawing at room temperature. In the course of the drawing, an intermediate annealing was done 600°C so as to draw it to the final wire diameter of 0.5 mm. In its sectional structure the vanadium core was approximately 0.20 mm in diameter and its outer side was covered with a silver-gallium alloy layer of approximately 0.15 mm in thickness. Then a heat treatment was applied to said wire in vacuum of $1 \times 10^{-4}$ mmHg at 650°C for 50 hours obtaining a superconductive wire having a transition temperature of 15.0°K. The measurement of the critical current of said superconductive wire at 4.2°K, 30k0e gave a value of 20A. This wire also could be easily soldered with lead-tin solder. A subsequent examination of the sectional structure of said wire by means of an optical microscope and an X-ray microanalyzer disclosed that a $V_3Ga$ layer approximately 6$\mu$ in thickness was formed on the vanadium core and on the surface thereof a metallic layer consisting mainly of silver containing minor quantities of gallium was formed. The relation between the heat treatment temperature of the wire and transition temperature in this Example 3 is shown by the curve 5 in FIG. 2. It is observable from this curve that as a post-work heat treatment temperature a range of 650°C to 700°C is optimum.

EXAMPLE 4

A Cu-Si alloy containing 8 atomic percent silicon was melted in a Tanmann furnace in the air. A V-Hf alloy rod containing 3 atomic percent hafnium was set and hold vertically in the center of a metal mold. The diameter of the V-Hf rod was 8 mm and the inner diameter of the mold was 20 mm. The molten Cu-Si alloy was cast into the metal mold. By this method, a composite of vanadium and surrounding Cu-Si alloy was made. Then the composite was fabricated by cold rolling into a tape having the final thickness of 0.15 mm with an intermediate annealing at 650°C. In its sectional structure thickness of the core metal was approximately 0.07 mm and a copper-silicon alloy layer approximately 0.04 mm in thickness covered both faces thereof. Then, said tape was heat-treated at 1,000°C for 20 hours and as a result a $V_3Si$ layer was formed and the transition temperature of the tape was 16.7°K.

EXAMPLE 5

Figure 5:
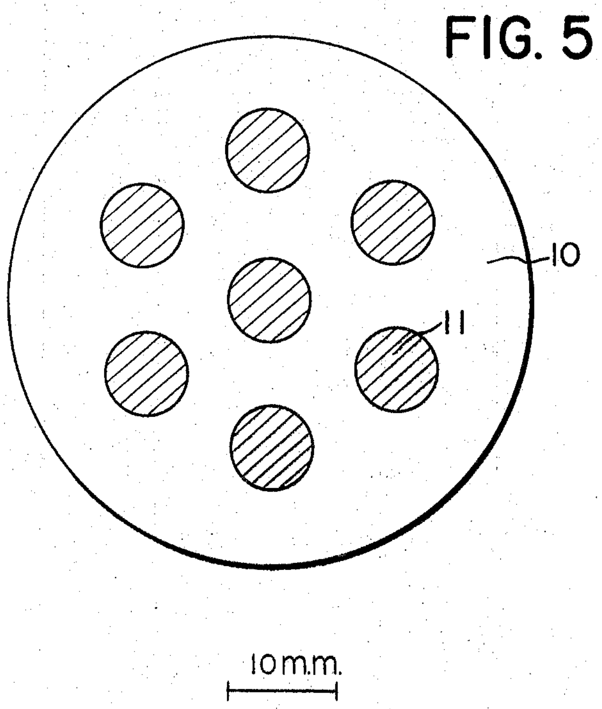
FIG. 5 is a diagrammatic sectional view of an embodiment of composites to be used for a method of the present invention.

An alloy bar 48 mm in diameter and 100 mm in length was made by melting an alloy consisting of 84 atomic percent of copper, 10 atomic percent of silver and 6 atomic petcent of silicon in a Tanmann furnace in air, then cut and shaped with a lathe so as to be 45 mm in diameter and drilled therein seven holes of 7 mm in diameter wherein pure vanadium bars were inserted to make a composite. FIG. 5 shows the sectional view, dimensions, and structure of the composite in this Example 5, and in the copper-silver-silicon alloy 10, vanadium 11 is positioned with uniform spacing. This composite with seven inserted vanadium bars was fabricated using a grooved roll into a square bar with sides of 6 mm. Next, after rounding the section by swaging, it was subjected to wire drawing to be fabricated into a wire having the final diameter of 0.7 mm, and the resultant sectional structure had approximately similar figures to that shown in FIG. 5. During the fabrication an annealing at 600°C for 1 hour was done. A heat treatment of the said wire at 950°C for 20 hours brought about growth of a $V_3Si$ layer on the surface of seven pure vanadium cores to about 4μ thick. Also in respect of the superconductive properties, a transition temperature of 16.8°K, and a critical current of 30 A at 4.2°K, 30k0e were obtained. The curve 6 in FIG. 2 shows the relation between heat-treatment temperature and transition temperature of the wire materials produced in this Example 5, and from said curve it is evident that when the heat treatment temperature is approximately 950°C, the transition temperature shows the maximum value.

EXAMPLE 6

Seven vanadium rods were set and hold vertically in a metal mold. The diameter of each vanadium rod was 7 mm and the inner diameter of the mold was 50 mm. A Cu-Ga alloy containing 19 atomic percent of gallium was melt in a Tanmann furnace in the air and then cast into the mold. By this method a composite of Cu-Ga alloy and vanadium having the cross-sectional configuration like that shown in FIG. 5 was made. This composite was fabricated into a rod of 6 mm in diameter by grooved rolling and swaging. Then this rod was cut into 19 pieces and put into a copper tube having an inner diameter of 30 mm and an outer diameter of 50 mm. The resulting composite was fabricated into a wire of 0.5 mm in diameter by grooved rolling, swaging and drawing with intermediate annealings at 650°C. The final wire had totaly 133 vanadium filamentary cores having an average diameter of about 10μ. After the heat treatment at 700°C for 20 hrs. these vanadium cores almost entirely changed to $V_3Ga$ filamentary cores. This wire showed a critical current of 30 A at 4.2°K and in a transverse magnetic field of 30k0e. Such kind of wire which includes very thin superconducting filaments is useful for AC application.

According to the present invention, the manufacture of $V_3Ga$ and $V_3Si$ superconductors can be simplified extremely and can give excellent superconducting properties. The $V_3Ga$ and $V_3Si$ superconductors produced in accordance with the present invention are rich in flexibility so that even if they are wound into coils 20 mm in diameter, no deterioration in the superconducting properties is observed.

The present invention is not limited by the aforementioned examples, but permits various variations within the range of the claim. For instance, a composite consisting of plural substrate metals can be arranged in a manner different from that shown in FIG. 5 or to make cooling by liquefied helium efficient it can be shaped into hollow types. And also a sandwich structure wherein the basic metals and alloys of copper of silver or copper-silver alloy containing gallium or silicon are stacked in a stratiform configuration is possible.

EXAMPLE 7

A tape of 0.13 mm in thickness was made by following the procedure of Example 1, but using an alloy composed of vanadium containing 1 atomic percent of titanium as a core metal and the resulting tape was subjected to a heat treatment at 700°C for 20 hours, and the critical temperature was measured. The width and the length of the sample cut from the tape were 3 mm and 50 mm, respectively. A critical current of 175 A was obtained in a transverse magnetic field of 30 k0e at 4.2°K.

We claim:

1. A method of producing a superconductor element having an outer protective layer, wherein said element includes a superconductor selected from the group consisting of $V_3Ga$ and $V_3Si$ superconductors, which comprises the steps of: providing an elongated composite member having an outer sheath comprising a material selected from a first group of materials consisting of copper, silver and a copper-silver alloy, each of them containing 0.1 to 30 atomic percent gallium or 0.1 to 10 atomic percent silicon, and having a core material encompassed by said outer sheath and selected from a second group of materials consisting of a vanadium alloy containing 0.1 to 10 atomic percent titanium, zirconium or hafnium, and subjecting said composite member to a heat treatment to provide said superconductor of $V_3Ga$ or $V_3Si$ having a said protective layer comprising said material selected from said first group.

2. A method as set forth in claim 1, in which prior to said heat treating step one or more of the said composites are coated with a conductor selected from the group consisting of copper, silver and aluminum, and the resulting coated member is subjected to plastic deformation to form it into a desired shape.

3. A method of producing a superconductor element as set forth in claim 1, wherein said step of providing an elongated composite is performed by providing a plurality of parallel rods of said material of said second group within said outer sheath of material of said first group which thereby encompasses said rods.

4. A method of producing a superconductor element having an outer protective layer, wherein said element includes a superconductor of $V_3Ga$, comprising the steps of providing a composite of a sheath comprising a member selected from a first group consisting of copper, silver and a copper-silver alloy, each of them containing 0.1 to 30 atomic percent gallium, and a core metal selected from a second group consisting of a vanadium alloy containing 0.1 to 10 atomic percent titanium, zirconium or hafnium, subjecting said composite to plastic deformation to form it into a desired shape, and subjecting the thus formed composite to a heat treatment at 500° to 950°C to form a compound layer of $V_3Ga$ between the core metal and said sheath.

5. A method as set forth in claim 4, in which the heat treatment is effected for from 5 minutes to 100 hours.

6. A method of producing a superconductor element having an outer protective layer, wherein said element includes a superconductor of $V_3Si$ comprising the steps of providing a composite of a sheath comprising a member selected from a first group consisting of copper, silver and a copper-silver alloy, each of them containing 0.1 to 10 atomic percent silicon, and a core metal selected from a second group consisting of a vanadium alloy containing 0.1 to 10 atomic percent titanium, zirconium or hafnium, subjecting said composite to plastic deformation to form it into a desired shape, and subjecting the thus formed composite to a heat treatment at 600° to 1,200°C to form a compound layer of $V_3Si$ between the core metal and said sheath.

7. A method as set forth in claim 6, in which the heat treatment is effected for from 5 minutes to 100 hours.

* * * * *